(12) United States Patent
Qiao et al.

(10) Patent No.: US 11,973,880 B2
(45) Date of Patent: Apr. 30, 2024

(54) DATA PROCESSING METHOD AND DATA PROCESSING DEVICE

(71) Applicant: Huawei Technologies Co., Ltd., Shenzhen (CN)

(72) Inventors: Yunfei Qiao, Hangzhou (CN); Rongdao Yu, Shenzhen (CN); Yinggang Du, Shenzhen (CN); Guangjian Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 429 days.

(21) Appl. No.: 17/215,505

(22) Filed: Mar. 29, 2021

(65) Prior Publication Data

US 2021/0218578 A1     Jul. 15, 2021

Related U.S. Application Data

(63) Continuation of application No. PCT/CN2019/091187, filed on Jun. 14, 2019.

(30) Foreign Application Priority Data

Sep. 30, 2018  (CN) .......................... 201811160657.9

(51) Int. Cl.
*H04L 9/32* (2006.01)
*H04B 7/185* (2006.01)
(Continued)

(52) U.S. Cl.
CPC .......... *H04L 9/3247* (2013.01); *H04L 9/0643* (2013.01); *H04W 36/008375* (2023.05);
(Continued)

(58) Field of Classification Search
CPC ....... H04L 9/3247; H04L 9/0643; H04L 9/50; H04L 9/3239; H04W 36/008375;
(Continued)

(56) References Cited

U.S. PATENT DOCUMENTS 9,426,061 B2   8/2016  Chiba
9,681,337 B2   6/2017  Davis et al.
(Continued)

FOREIGN PATENT DOCUMENTS

CN   101001101 A   7/2007
CN   107147489 A   9/2017
(Continued)

OTHER PUBLICATIONS

Li, S. et al., "A Distributed Authentication Protocol Using Identity-Based Encryption and Blockchain for LEO Network," ICIAP: International Conference on Image Analysis and Processing, 17th International Conference, Naples Italy, Sep. 13, 2013, 2017, 15 pages.
(Continued)

*Primary Examiner* — Vu V Tran
(74) *Attorney, Agent, or Firm* — SLATER MATSIL, LLP

(57) ABSTRACT

A data processing method for a data processing system having a first communications node and a second communications node where the first communications node corresponds to a first blockchain node and the second communications node corresponds to a second blockchain node that maintains a same block chain as the first blockchain node, the method including obtaining, by the first communications node, to-be-verified data when a terminal camps on a target cell, where the to-be-verified data is obtained based on camping information of the terminal, and the target cell is a cell within signal coverage of the first communications node sending, by the first communications node, the to-be-verified data to the second communications node, so that the second communications node verifies the to-be-verified data based on the second blockchain node, and obtaining, by the first communications node, a target block if the verification succeeds.

20 Claims, 12 Drawing Sheets

(51) Int. Cl.
*H04L 9/00* (2022.01)
*H04L 9/06* (2006.01)
*H04W 12/06* (2021.01)
*H04W 12/08* (2021.01)
*H04W 12/106* (2021.01)
*H04W 36/00* (2009.01)
*H04W 36/08* (2009.01)
*H04W 36/30* (2009.01)
*H04W 36/32* (2009.01)
*H04W 84/06* (2009.01)

(52) U.S. Cl.
CPC .......... *H04W 36/08* (2013.01); *H04W 36/30* (2013.01); *H04L 9/50* (2022.05)

(58) Field of Classification Search
CPC ..... H04W 36/08; H04W 36/30; H04W 36/32; H04W 12/08; H04W 12/106; H04W 12/06; H04W 84/06; H04B 7/1853; H04B 7/18519
See application file for complete search history.

(56) References Cited

U.S. PATENT DOCUMENTS

| | | | | |
|---|---|---|---|---|
| 10,491,376 | B1* | 11/2019 | Suthar | .................... H04L 63/102 |
| 10,952,113 | B2* | 3/2021 | Mahkonen | ...... H04W 36/00835 |
| 2007/0266244 | A1 | 11/2007 | Walker et al. | |
| 2018/0103013 | A1 | 4/2018 | Imai et al. | |
| 2019/0173667 | A1 | 6/2019 | Wang et al. | |
| 2019/0306757 | A1* | 10/2019 | Husain | ................. G08G 5/0013 |
| 2019/0349188 | A1* | 11/2019 | Guo | .................... H04L 67/1097 |
| 2020/0099688 | A1* | 3/2020 | Anders | ................... G06F 40/30 |

FOREIGN PATENT DOCUMENTS

| | | |
|---|---|---|
| CN | 107249009 A | 10/2017 |
| CN | 107734502 A | 2/2018 |
| CN | 107852230 A | 3/2018 |
| CN | 108124293 A | 6/2018 |
| RU | 2628151 C2 | 8/2017 |
| WO | 2015139146 A1 | 9/2015 |
| WO | 2018112948 A1 | 6/2018 |

OTHER PUBLICATIONS

Sharma, V. et al., "Secure and Energy-Efficient Handover in Fog Networks Using Blockchain-Based DMM," IEEE Communications Magazine, vol. 56, Issue 5, May 2018, 10 pages.

* cited by examiner

DATA PROCESSING METHOD AND DATA PROCESSING DEVICE

CROSS-REFERENCE TO RELATED APPLICATIONS

This application is a continuation of International Application No. PCT/CN2019/091187, filed on Jun. 14, 2019, which claims priority to Chinese Patent Application No. 201811160657.9, filed on Sep. 30, 2018. The disclosures of the aforementioned applications are hereby incorporated by reference in their entireties.

TECHNICAL FIELD

This application relates to the communications field, and in particular, to a data processing method and a data processing device.

BACKGROUND

Briefly, conventional satellite communication is communication performed by radio communication stations on the earth by using satellites as relays. A satellite communications system generally includes three parts: a space segment, a ground segment, and a user segment. The space segment is usually communications satellites, the ground segment is usually control centers or various gateways, and the user segment is usually terminals.

As shown in FIG. 1, when a terminal performs satellite handover, for example, the terminal is handed over from a source satellite to a target satellite, the terminal first needs to send a handover request to the target satellite, to complete a series of operations such as measurement reporting, handover decision, and radio resource control (RRC) connection configuration. The target satellite sends a path switching request to a gateway of the ground segment, and receives an acknowledgement message fed back by the gateway. The source satellite can release a network resource only after the gateway acknowledges the path switching request. In this way, a satellite handover process is completed. Subsequently, data sent by a core network is forwarded by the target satellite to the terminal, but is not forwarded by the source satellite to the terminal.

It can be learned that, when the terminal performs satellite handover, the satellite handover process can be completed only after the path switching request is acknowledged between a satellite device of the space segment and a gateway device of the ground segment. However, frequent satellite handover usually occurs. In this case, information needs to be frequently exchanged between satellites and gateways. This causes large network overheads.

SUMMARY

A first aspect of this application provides a data processing method. The method is applied to a data processing system, the data processing system includes a first communications node and a second communications node, the first communications node corresponds to a first blockchain node, the second communications node corresponds to a second blockchain node, the first blockchain node and the second blockchain node are nodes in a same blockchain, and therefore maintain the same blockchain, and the method includes the following.

The first communications node obtains to-be-verified data after a terminal camps on a target cell, where the target cell is a cell within signal coverage of the first communications node, that the terminal camps on the target cell means that the terminal enters the signal coverage of the first communications node, and the to-be-verified data is obtained by the first communications node based on camping information after the terminal camps on the target cell.

The first communications node broadcasts the to-be-verified data to the second communications node, where there is at least one second communications node, and then the second communications node can verify the to-be-verified data based on the second blockchain node and a distributed data storage feature of the blockchain.

The first communications node obtains a target block when a verification result of the to-be-verified data is that the verification succeeds.

This embodiment of this application has the following advantages: The second communications node and the first communications node each correspond to one blockchain node, and these blockchain nodes maintain the same blockchain. Herein, the first communications node may be a satellite, and the second communications node may be a satellite or a cellular node, for example, a control center, or gateway, or cellular base station of a ground segment. The first communications node obtains the to-be-verified data when the terminal accesses the target cell, where the to-be-verified data is obtained based on the camping information of the terminal. Then, the first communications node sends the to-be-verified data to the second communications node, and the second communications node can obtain the verification result after verifying the to-be-verified data based on the second blockchain node. In this way, the terminal can complete a process of camping on the target cell. In this embodiment, the to-be-verified data is sent between the first communications node and the second communications node. Because each node in the blockchain has features such as point-to-point transmission and a consensus mechanism, each node in the blockchain may obtain a verification result after verifying the to-be-verified data. This is equivalent to that a verification process of the to-be-verified data is completed by using the blockchain. After the verification result is obtained, the terminal can camp on the target cell without participation of a gateway. Therefore, in this application, the terminal can camp on the target cell only by using interaction between the first communications node and the second communications node, and data exchange between a satellite and a gateway of a ground segment is not required, thereby reducing network overheads.

According to the first aspect, in a first implementation of the first aspect, the terminal may perform the step of camping on the target cell after the terminal performs cell handover and is handed over to the target cell, and that the to-be-verified data is obtained based on camping information of the terminal includes that the to-be-verified data is generated by the first communications node based on cell information of a cell on which the terminal camps before handed over, the cell information of the cell on which the terminal camps before handed over may be used by the second communications node to match cell information that is of the cell on which the terminal camps before handed over and that is stored in the second blockchain node, to obtain a matching result, the second blockchain node records information about a last cell on which the terminal camps before the current handover, and the information about the last cell on which the terminal camps is the cell information of the cell on which the terminal camps before handed over.

In this embodiment, a method for obtaining the to-be-verified data is described. Feasibility of the solution is improved.

According to the first aspect, in a second implementation of the first aspect, the terminal may perform the step of camping on the target cell after the terminal performs cell handover and is handed over to the target cell, or the terminal may perform the step of camping on the target cell after the terminal performs cell location update and a cell location is updated to the target cell, and that the to-be-verified data is obtained based on camping information of the terminal includes that the to-be-verified data is generated by the first communications node based on a permission level of the terminal, the permission level of the terminal is a security permission level granted to the terminal, the second blockchain node stores a permission level that the target cell is allowed to be accessed, and the permission level of the terminal may be used by the second communications node to verify, based on the second blockchain node, whether the terminal has permission to access the target cell.

In this embodiment, another method for obtaining the to-be-verified data is described. Feasibility and flexibility of the solution are improved.

According to the first aspect and either of the first and second implementations of the first aspect, in a third implementation of the first aspect, that the first communications node obtains a target block includes the following.

The first communications node may generate the target block based on the to-be-verified data.

The method further includes the following.

After the first communications node generates the target block, the first communications node broadcasts the target block to the second communications node, and then the second communications node may add the target block to the blockchain maintained by the second blockchain node.

Optionally, before the first communications node generates the target block based on the to-be-verified data, the method further includes the following.

The first communications node may perform the step of generating the target block based on a verification success message after receiving the verification success message sent by the second communications node.

In this embodiment, a possible case in which the first communications node obtains the target block is described. Feasibility of the solution is improved.

According to the first aspect and either of the first and second implementations of the first aspect, in a fourth implementation of the first aspect, that the first communications node obtains a target block includes the following.

The first communications node may alternatively obtain the target block after the second communications node generates the target block based on the to-be-verified data. An obtaining method is that the second communications node broadcasts the target block to the first communications node.

In this embodiment, another possible case in which the first communications node obtains the target block is described. Feasibility and flexibility of the solution are improved.

According to the first aspect and either of the first and second implementations of the first aspect, in a fifth implementation of the first aspect, after the first communications node obtains the target block, the first communications node may add the target block to the blockchain maintained by the first blockchain node, to store the target block generated based on the to-be-verified data.

In this embodiment, the blockchain may store the target block, to verify camping information when the terminal performs next cell handover or location update. Practicability of the solution is improved.

A second aspect of this application provides a data processing method. The method is applied to a data processing system, the data processing system includes a first communications node and a second communications node, the first communications node corresponds to a first blockchain node, the second communications node corresponds to a second blockchain node, the first blockchain node and the second blockchain node are nodes in a same blockchain, and therefore maintain the same blockchain, and the method includes the following.

After a terminal camps on a target cell, the second communications node receives to-be-verified data sent by the first communications node in a broadcast manner, where the target cell is a cell within signal coverage of the first communications node, that the terminal camps on the target cell means that the terminal enters the signal coverage of the first communications node, the to-be-verified data is obtained by the first communications node based on camping information after the terminal camps on the target cell, and there is at least one second communications node.

The second communications node may verify the to-be-verified data based on the second blockchain node and a distributed data storage feature of the blockchain.

The second communications node obtains a target block when a verification result of the to-be-verified data is that the verification succeeds.

Herein, the first communications node may be a satellite, and the second communications node may be a satellite or a cellular node, for example, a control center, or gateway, or cellular base station of a ground segment.

In this embodiment, the to-be-verified data is sent between the first communications node and the second communications node. Because each node in the blockchain has features such as point-to-point transmission and a consensus mechanism, each node in the blockchain may obtain a verification result after verifying the to-be-verified data. This is equivalent to that a verification process of the to-be-verified data is completed by using the blockchain. After the verification result is obtained, the terminal can camp on the target cell without participation of a gateway. Therefore, in this application, the terminal can camp on the target cell only by using interaction between the first communications node and the second communications node, and data exchange between a satellite and a gateway of the ground segment is not required, thereby reducing network overheads.

According to the second aspect, in a first implementation of the second aspect, the terminal may perform the step of camping on the target cell after the terminal performs cell handover and is handed over to the target cell, and that the second communications node verifies the to-be-verified data based on the second blockchain node includes that the to-be-verified data is generated based on the camping information of the terminal, and the camping information includes cell information of the terminal before the cell handover.

The second blockchain node records information about a last cell on which the terminal camps before the current handover. The information about the last cell on which the terminal camps is cell information of the cell on which the terminal camps before handed over. The second communications node may match the cell information that is of the cell on which the terminal camps before handed over and that is in the second blockchain node with the cell information that is of the cell on which the terminal camps before handed over and that is in the to-be-verified data. If the matching succeeds, a verification result is that the verification succeeds, otherwise, the verification fails.

In this embodiment, a manner in which the second communications node verifies the to-be-verified data is described. Feasibility of the solution is improved.

According to the second aspect, in a second implementation of the second aspect, the terminal may perform the step of camping on the target cell after the terminal performs cell handover and is handed over to the target cell, or the terminal may perform the step of camping on the target cell after the terminal performs cell location update and a cell location is updated to the target cell, and that the second communications node verifies the to-be-verified data based on the second blockchain node includes that the to-be-verified data is obtained based on the camping information of the terminal, the camping information includes a permission level of the terminal, the second communications node may determine the permission level of the terminal in the to-be-verified data, and the permission level of the terminal is a security permission level granted to the terminal.

The second blockchain node stores a permission level that the target cell is allowed to be accessed. The second communications node may verify, based on the second blockchain node, whether the terminal has permission to access the target cell, to obtain a verification result.

In this embodiment, another manner in which the second communications node verifies the to-be-verified data is described. Feasibility and flexibility of the solution are improved.

According to the second aspect and either of the first and second implementations of the second aspect, in a third implementation of the second aspect, that the second communications node obtains a target block includes the following.

The second communications node may generate the target block based on the to-be-verified data.

The method further includes the following.

The second communications node broadcasts the target block to the first communications node after the second communications node generates the target block, so that the first communications node adds the target block to the blockchain maintained by the first blockchain node.

In this embodiment, a possible case in which the second communications node obtains the target block is described. Feasibility of the solution is improved.

According to the second aspect and either of the first and second implementations of the second aspect, in a fourth implementation of the second aspect, that the second communications node obtains a target block includes the following.

The second communications node may alternatively obtain the target block after the first communications node generates the target block based on the to-be-verified data. An obtaining method is that the first communications node broadcasts the target block to the second communications node.

In this embodiment, another possible case in which the second communications node obtains the target block is described. Feasibility and flexibility of the solution are improved.

According to the second aspect and either of the first and second implementations of the second aspect, in a fifth implementation of the second aspect, after the second communications node obtains the target block, the second communications node may add the target block to the blockchain maintained by the second blockchain node, to store the target block generated based on the to-be-verified data.

In this embodiment, the blockchain may store the target block, to verify camping information when the terminal performs next cell handover or location update. Practicability of the solution is improved.

A third aspect of this application provides a data processing method. The method is applied to a data processing system, the data processing system includes a first communications node and a second communications node, the first communications node corresponds to a first blockchain node, the second communications node corresponds to a second blockchain node, the first blockchain node and the second blockchain node are nodes in a same blockchain, and therefore maintain the same blockchain, and the method includes the following.

The first communications node obtains to-be-verified data when a terminal camps on a target cell, where the target cell is a cell within signal coverage of the first communications node, that the terminal camps on the target cell means that the terminal enters the signal coverage of the first communications node, the to-be-verified data includes first network access authentication data of the terminal, network access authentication data is data used by a communications node to perform permission verification on the terminal when the terminal accesses a network, and the first network access authentication data obtained by the first communications node is reported by the terminal.

The first communications node verifies the to-be-verified data, and determines whether the terminal has permission to access the network, the first communications node broadcasts the to-be-verified data to the second communications node if a verification result of the first communications node is that the verification succeeds, where there is at least one second communications node, so that the second communications node also verifies the to-be-verified data and determines whether the terminal has the permission to access the network, and the first communications node may obtain the target block if a verification result of the second communications node is that the verification succeeds, where the target block is generated based on the to-be-verified data.

In this embodiment, for the first network access authentication data, after successfully verifying the to-be-verified data, the first communications node broadcasts the to-be-verified data to the second blockchain node in the blockchain for verifying. If the second blockchain node also successfully verifies the to-be-verified data, the first communications node obtains the target block and adds the target block to the blockchain, so that when the terminal accesses the network next time, the first communications node directly verifies network access authentication data by using the blockchain to which the target block is added. Data exchange between a satellite and a gateway of a ground segment is not required, thereby reducing network overheads.

According to the third aspect, in a first implementation of the third aspect, after the first communications node obtains the target block, the first communications node may add the target block to the blockchain maintained by the first blockchain node. After the target block is added to the blockchain, the first blockchain node corresponding to the first communications node also stores the target block. The first communications node may verify, based on the first blockchain node, network access verification data of the terminal that completes the first network access authentication.

In this embodiment, the network access authentication data of the terminal when the terminal accesses the network for the first time may be stored in the blockchain after the target block is generated, and then when the terminal accesses the network again, the first communications node may verify the to-be-verified data by using the previously stored target block. Data exchange between a satellite and a gateway of a ground segment is not required, thereby reducing network overheads.

A fourth aspect of this application provides a data processing method. The method is applied to a data processing system, the data processing system includes a first communications node and a second communications node, the first communications node corresponds to a first blockchain node, the second communications node corresponds to a second blockchain node, the first blockchain node and the second blockchain node are nodes in a same blockchain, and therefore maintain the same blockchain, and the method includes the following.

When a terminal camps on a target cell, the second communications node receives to-be-verified data sent by the first communications node, where the target cell is a cell within signal coverage of the first communications node, that the terminal camps on the target cell means that the terminal enters the signal coverage of the first communications node, the to-be-verified data includes first network access authentication data, and the to-be-verified data is data that has been verified and successfully verified by the first communications node, and network access authentication data is data used by a communications node to perform permission verification on the terminal when the terminal accesses a network.

Then, the second communications node may verify the to-be-verified data, and the second communications node obtains a target block if a verification result of the second communications node is that the verification succeeds, where the target block is generated based on the to-be-verified data.

In this embodiment, for the first network access authentication data, after the second communications node successfully verifies the to-be-verified data, the second communications node obtains the target block and adds the target block to the blockchain, so that when the terminal accesses the network next time, the second communications node may directly verify network access authentication data by using the blockchain to which the target block is added. Data exchange between a satellite and a gateway of a ground segment is not required, thereby reducing network overheads.

According to the fourth aspect, in a first implementation of the fourth aspect, after the second communications node obtains the target block, the second communications node may add the target block to the blockchain maintained by the second blockchain node. After the target block is added to the blockchain, the second blockchain node corresponding to the second communications node also stores the target block. The second communications node may verify, based on the second blockchain node, network access verification data of the terminal that completes the first network access authentication.

In this embodiment, the network access authentication data of the terminal when the terminal accesses the network for the first time may be stored in the blockchain after the target block is generated, and then when the terminal accesses the network again, the second communications node may verify the to-be-verified data by using the previously stored target block. Data exchange between a satellite and a gateway of a ground segment is not required, thereby reducing network overheads.

A fifth aspect of this application provides a communications node. The communications node is a first communications node in a data processing system, the data processing system further includes a second communications node, the first communications node corresponds to a first blockchain node, the second communications node corresponds to a second blockchain node, the first blockchain node and the second blockchain node maintain a same blockchain, and the communications node includes an obtaining unit, configured to obtain to-be-verified data when a terminal camps on a target cell, where the to-be-verified data is obtained based on camping information of the terminal, and the target cell is a cell within signal coverage of the first communications node, and a sending unit, configured to send the to-be-verified data to the second communications node, so that the second communications node verifies the to-be-verified data based on the second blockchain node, where the obtaining unit is further configured to obtain a target block if a verification result is that the verification succeeds.

According to the fifth aspect, in a first implementation of the fifth aspect, the terminal performs the step of camping on the target cell after the terminal is handed over to the target cell, the communications node further includes a processing unit, and that the to-be-verified data is obtained based on camping information of the terminal includes that the to-be-verified data is generated by the processing unit based on cell information of a cell on which the terminal camps before handed over, and the cell information of the cell on which the terminal camps before handed over is used by the second communications node to match cell information that is of the cell on which the terminal camps before handed over and that is in the second blockchain node.

According to the fifth aspect, in a second implementation of the fifth aspect, the terminal performs the step of camping on the target cell after the terminal is handed over to the target cell or a location of the terminal is updated to the target cell, the communications node further includes a processing unit, and that the to-be-verified data is obtained based on camping information of the terminal includes that the to-be-verified data is generated by the processing unit based on a permission level of the terminal, and the permission level of the terminal is used by the second communications node to verify, based on the second blockchain node, access permission of the terminal relative to the first communications node.

According to the fifth aspect and either of the first and second implementations of the fifth aspect, in a third implementation of the fifth aspect, the obtaining unit is specifically configured to generate the target block based on the to-be-verified data, the communications node further includes a block broadcast unit, configured to broadcast the target block to the second communications node, so that the second communications node adds the target block to the blockchain maintained by the second blockchain node, and the obtaining unit is further configured to receive a verification success message sent by the second communications node, where the verification success message is used to indicate the obtaining unit to perform the step of generating the target block.

According to the fifth aspect and either of the first and second implementations of the fifth aspect, in a fourth implementation of the fifth aspect, the obtaining unit is specifically configured to obtain the target block generated by the second communications node based on the to-be-verified data.

According to the fifth aspect and either of the first and second implementations of the fifth aspect, in a fifth implementation of the fifth aspect, the communications node further includes a storage unit, configured to add the target block to the blockchain maintained by the first blockchain node.

A sixth aspect of this application provides a communications node. The communications node is a second communications node in a data processing system, the data processing system further includes a first communications node, the first communications node corresponds to a first blockchain node, the second communications node corresponds to a second blockchain node, the first blockchain node and the second blockchain node maintain a same blockchain, and the communications node includes a receiving unit, configured to when a terminal camps on a target cell, receive to-be-verified data sent by the first communications node, where the to-be-verified data is obtained by the first communications node based on camping information of the terminal, and the target cell is a cell within signal coverage of the first communications node, a verification unit, configured to verify the to-be-verified data based on the second blockchain node, and an obtaining unit, configured to obtain a target block if a verification result is that the verification succeeds.

According to the sixth aspect, in a first implementation of the sixth aspect, the terminal performs the step of camping on the target cell after the terminal is handed over to the target cell, and the verification unit is specifically configured to determine, based on a historical handover record in the second blockchain node, cell information of a cell on which the terminal camps before handed over, and match cell information that is of the cell on which the terminal camps before handed over and that is in the to-be-verified data with the cell information that is of the cell on which the terminal camps before handed over and that is in the historical handover record, to obtain a matching result.

According to the sixth aspect, in a second implementation of the sixth aspect, the terminal performs the step of camping on the target cell after the terminal is handed over to the target cell or a location of the terminal is updated to the target cell, and the verification unit is specifically configured to determine a permission level of the terminal in the to-be-verified data, and verify, based on the second blockchain node, access permission of the terminal relative to the first communications node, to obtain a verification result.

According to the sixth aspect and either of the first and second implementations of the sixth aspect, in a third implementation of the sixth aspect, the obtaining unit is specifically configured to generate the target block based on the to-be-verified data, and the communications node further includes a block broadcast unit, configured to broadcast the target block to the first communications node, so that the first communications node adds the target block to the blockchain maintained by the first blockchain node.

According to the sixth aspect and either of the first and second implementations of the sixth aspect, in a fourth implementation of the sixth aspect, the obtaining unit is specifically configured to obtain the target block generated by the first communications node based on the to-be-verified data.

According to the sixth aspect and either of the first and second implementations of the sixth aspect, in a fifth implementation of the sixth aspect, the communications node further includes a storage unit, configured to add the target block to the blockchain maintained by the second blockchain node.

A seventh aspect of this application provides a communications node. The communications node is a first communications node in a data processing system, the data processing system further includes a second communications node, the first communications node corresponds to a first blockchain node, the second communications node corresponds to a second blockchain node, the first blockchain node and the second blockchain node maintain a same blockchain, and the communications node includes an obtaining unit, configured to obtain to-be-verified data when a terminal camps on a target cell, where the to-be-verified data includes first network access authentication data of the terminal, and the target cell is a cell within signal coverage of the first communications node, a verification unit, configured to verify the to-be-verified data, and a sending unit, configured to send the to-be-verified data to the second communications node if a verification result of the verification unit is that the verification succeeds, so that the second communications node verifies the to-be-verified data, where the obtaining unit is further configured to obtain a target block if a verification result of the second communications node is that the verification succeeds.

According to the seventh aspect, in a first implementation of the seventh aspect, the communications node further includes a storage unit, configured to add the target block to the blockchain maintained by the first blockchain node, where the first blockchain node to which the target block is added is used by the verification unit to verify network access verification data of the terminal that completes the first network access authentication.

An eighth aspect of this application provides a communications node. The communications node is a second communications node in a data processing system, the data processing system further includes a first communications node, the first communications node corresponds to a first blockchain node, the second communications node corresponds to a second blockchain node, the first blockchain node and the second blockchain node maintain a same blockchain, and the communications node includes a receiving unit, configured to when a terminal camps on a target cell, receive to-be-verified data sent by the first communications node, where the to-be-verified data is data that is successfully verified by the first communications node, the to-be-verified data includes first network access authentication data of the terminal, and the target cell is a cell within signal coverage of the first communications node, a verification unit, configured to verify the to-be-verified data, and an obtaining unit, configured to obtain a target block if a verification result of the verification unit is that the verification succeeds.

According to the eighth aspect, in a first implementation of the eighth aspect, the communications node further includes a storage unit, configured to add the target block to the blockchain maintained by the second blockchain node, where the blockchain to which the target block is added is used by the verification unit to verify network access verification data of the terminal that completes the first network access authentication.

A ninth aspect of this application provides a communications node, including a memory, a transceiver, a processor, and a bus system, where the memory is configured to store program instructions, the transceiver is configured to receive or send information under control of the processor, the processor is configured to execute the program in the memory, and the bus system is configured to connect the memory, the transceiver, and the processor, so that the memory, the transceiver, and the processor communicate with each other, where the processor is configured to invoke the program instructions in the memory to perform the method according to any one of the first aspect, the first to fifth implementations of the first aspect, the second aspect, and the first to fifth implementations of the second aspect.

According to the ninth aspect, in a first implementation of the ninth aspect, the communications node is a chip.

A tenth aspect of this application provides a computer-readable storage medium, including instructions. When the instructions are executed on a computer, the computer is enabled to perform the method according to any one of the first aspect, the first to fifth implementations of the first aspect, the second aspect, and the first to fifth implementations of the second aspect.

An eleventh aspect of this application provides a computer program product including instructions. When the instructions are executed on a computer, the computer is enabled to perform the method according to any one of the first aspect, the first to fifth implementations of the first aspect, the second aspect, and the first to fifth implementations of the second aspect.

DETAILED DESCRIPTION OF ILLUSTRATIVE EMBODIMENTS

Figure 1:
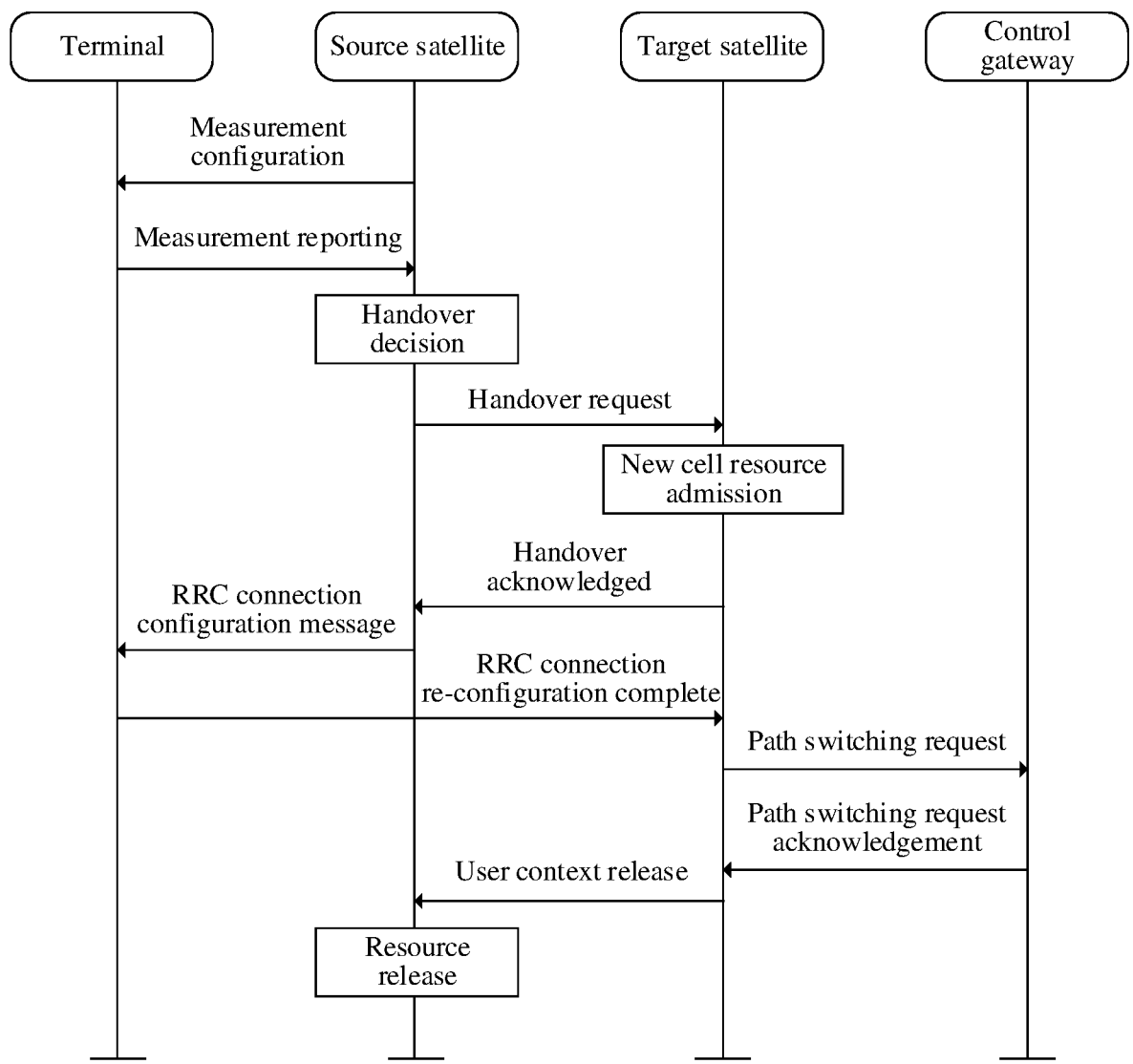
FIG. 1 is a schematic diagram of an existing cell handover according to this application.
Figure 2A:
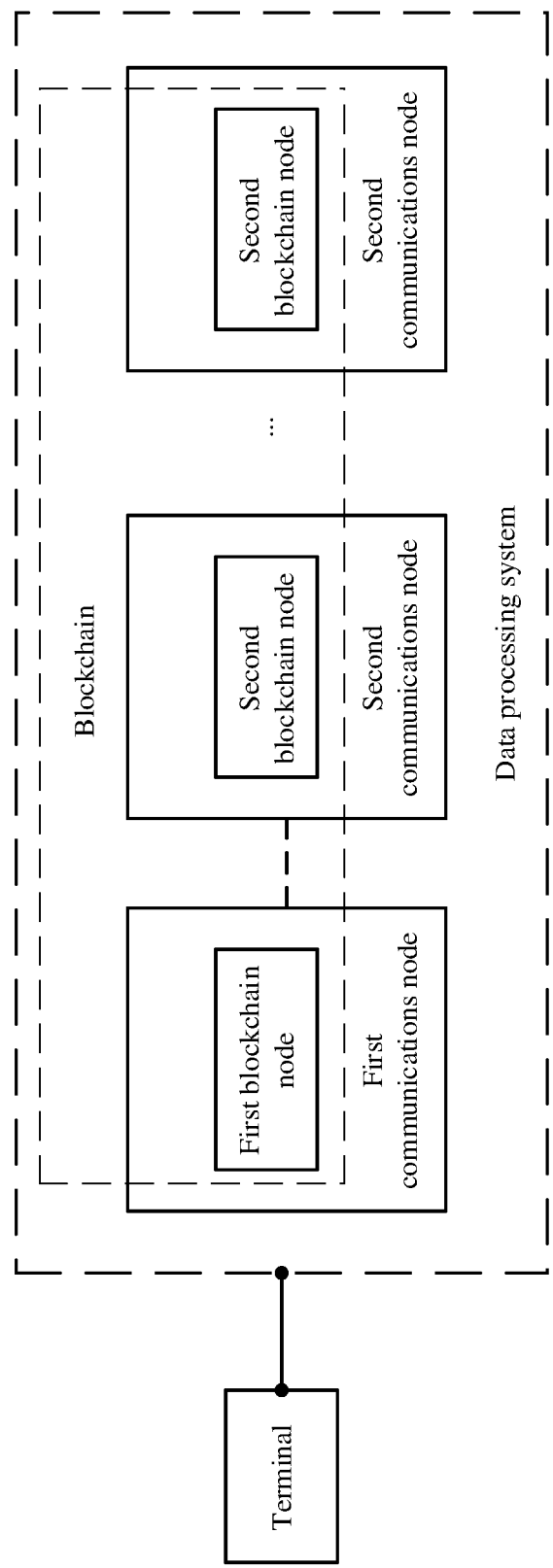
FIG. 2(a) is a schematic structural diagram of a data processing system according to this application.

A data processing method disclosed in this application may be applied to a data processing system. As shown in FIG. 2(a), the data processing system includes at least two communications nodes, each communications node corresponds to one blockchain node, and these blockchain nodes maintain a same blockchain. A first communications node corresponds to a first blockchain node, and there is one first communications node. A second communications node corresponds to a second blockchain node, and there is at least one second communications node. The first communications node may be a satellite node, and the satellite node may be a satellite at any altitude. The second communications node may be a satellite node, or may be a cellular node, for example, a control center, or gateway, or cellular base station of a ground segment. This is not specifically limited herein. The data processing system is connected to a terminal. When the terminal performs cell update, or cell handover, or location update, or authentication, the data processing system may process a request of the terminal without depending on a gateway device, a control device, or the like.

This application is implemented based on features such as blockchain point-to-point transmission, a consensus mechanism, distributed data storage, and a cryptography principle.

That a target cell is a cell within signal coverage of the first communications node indicates that a terminal enters the signal coverage of the first communications node after camping on the target cell.

In the specification, claims, and accompanying drawings of the present invention, the terms "first", "second", "third", "fourth", and so on (if any) are intended to distinguish between similar objects but do not necessarily indicate a specific order or sequence. It should be understood that the data termed in such a way is interchangeable in proper circumstances, so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 2B:
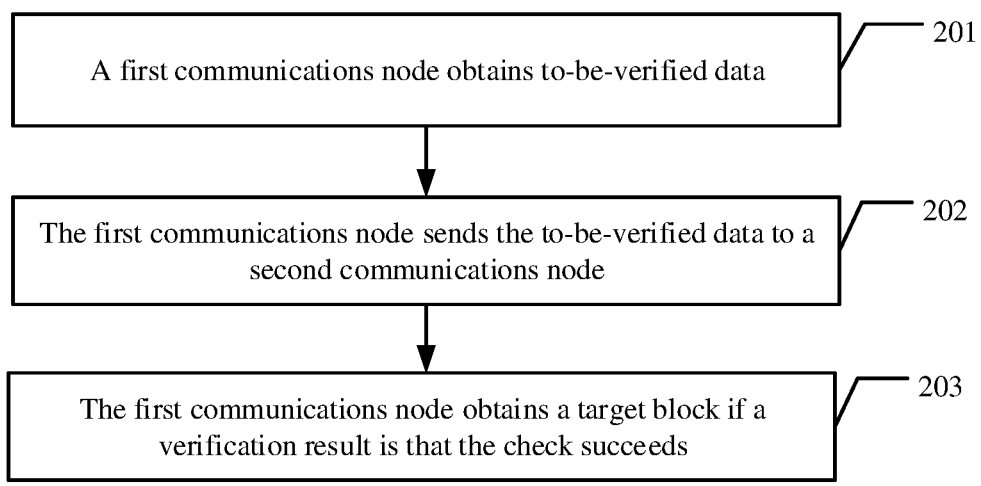
FIG. 2(b) is a schematic diagram of an embodiment of a data processing method according to this application.

Referring to FIG. 2(b), this application discloses a data processing method. The method may be applied to a cell handover or terminal location update scenario, and is described below.

201. A first communications node obtains to-be-verified data.

After a terminal camps on a target cell, because the target cell is a cell within signal coverage of the first communications node, the first communications node obtains camping information of the terminal and obtains the to-be-verified data based on the camping information. Then, the first communications node stores the to-be-verified data in a local storage unit. That the terminal camps on the target cell may be that the terminal accesses the target cell after performing cell handover or cell update, or that the terminal updates a location to the target cell after performing location update. This is not specifically limited herein.

It should be noted that a possible case of the to-be-verified data is that the to-be-verified data is the camping information of the terminal.

202. The first communications node sends the to-be-verified data to a second communications node.

The first communications node signs the to-be-verified data with a private key and then broadcasts the to-be-verified data to the second communications node. The second communications node performs decryption by using a public key of the first communications node to obtain the to-be-verified data. Then, the second communications node verifies the to-be-verified data by using historical camping information of the terminal that is stored in a corresponding second blockchain node, to obtain a verification result.

If the verification result is that the verification succeeds, the second communications node stores the to-be-verified data in a local storage unit of the second communications node.

The historical camping information is a set of camping information of the terminal when the terminal camps on the first communications node or the second communications node at any one or more moments before the terminal camps on the first communications node in this application.

203: The first communications node obtains a target block if the verification result is that the verification succeeds.

The first communications node obtains the target block if the verification result of the second communications node for the to-be-verified data is that the verification succeeds.

In this embodiment, the to-be-verified data is sent between the first communications node and the second communications node. Each node in the blockchain may obtain a verification result after verifying the to-be-verified data. This is equivalent to that a verification process of the to-be-verified data is completed by using the blockchain. After the verification result is obtained, the terminal can camp on the target cell without participation of a gateway. Therefore, in this application, the terminal can camp on the target cell only by using interaction between the first communications node and the second communications node, and data exchange between a satellite and a gateway of a ground segment is not required, thereby reducing network overheads.

Figure 3A:
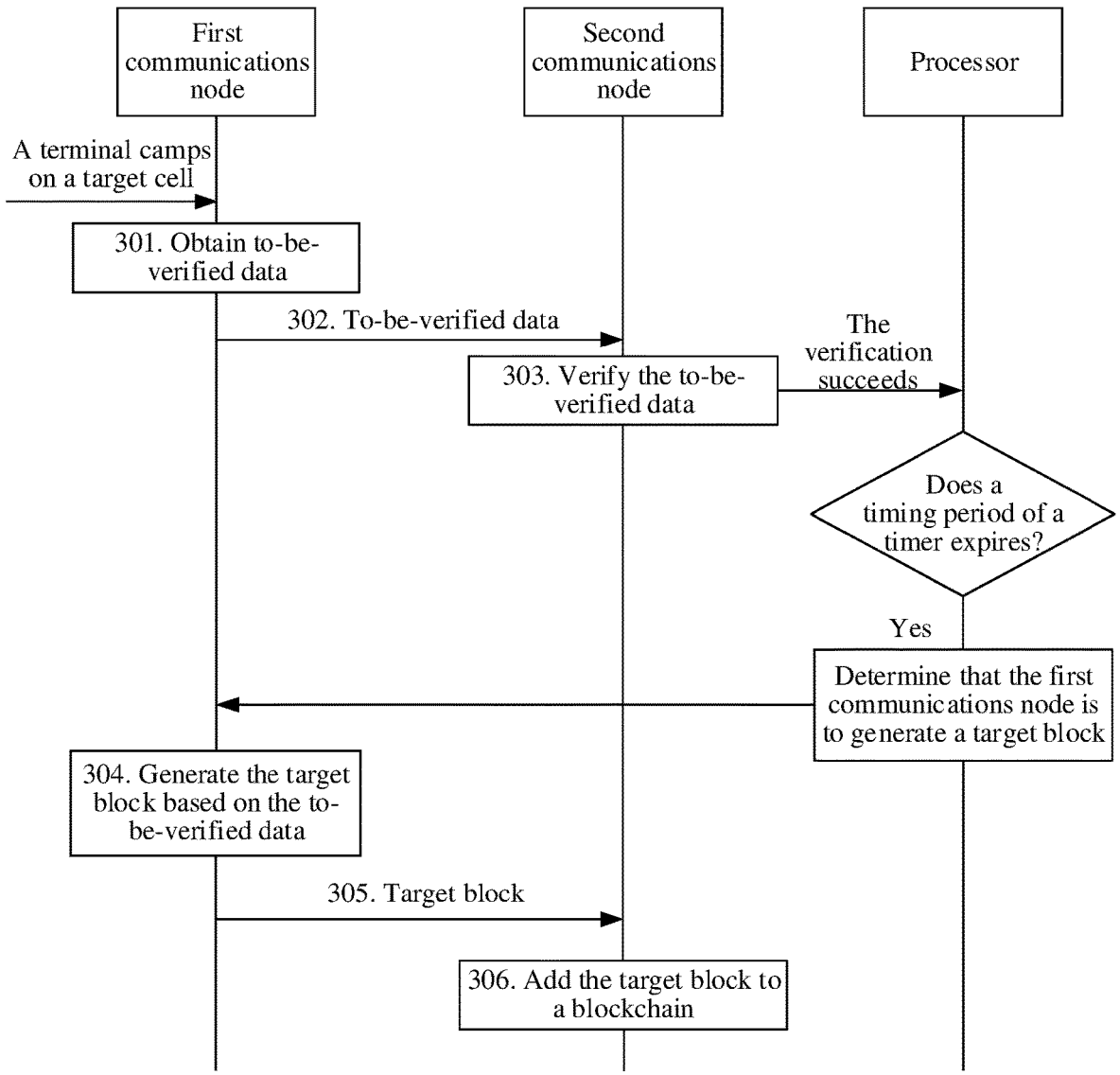
FIG. 3(a) is a schematic diagram of another embodiment of a data processing method according to this application.
Figure 3B:
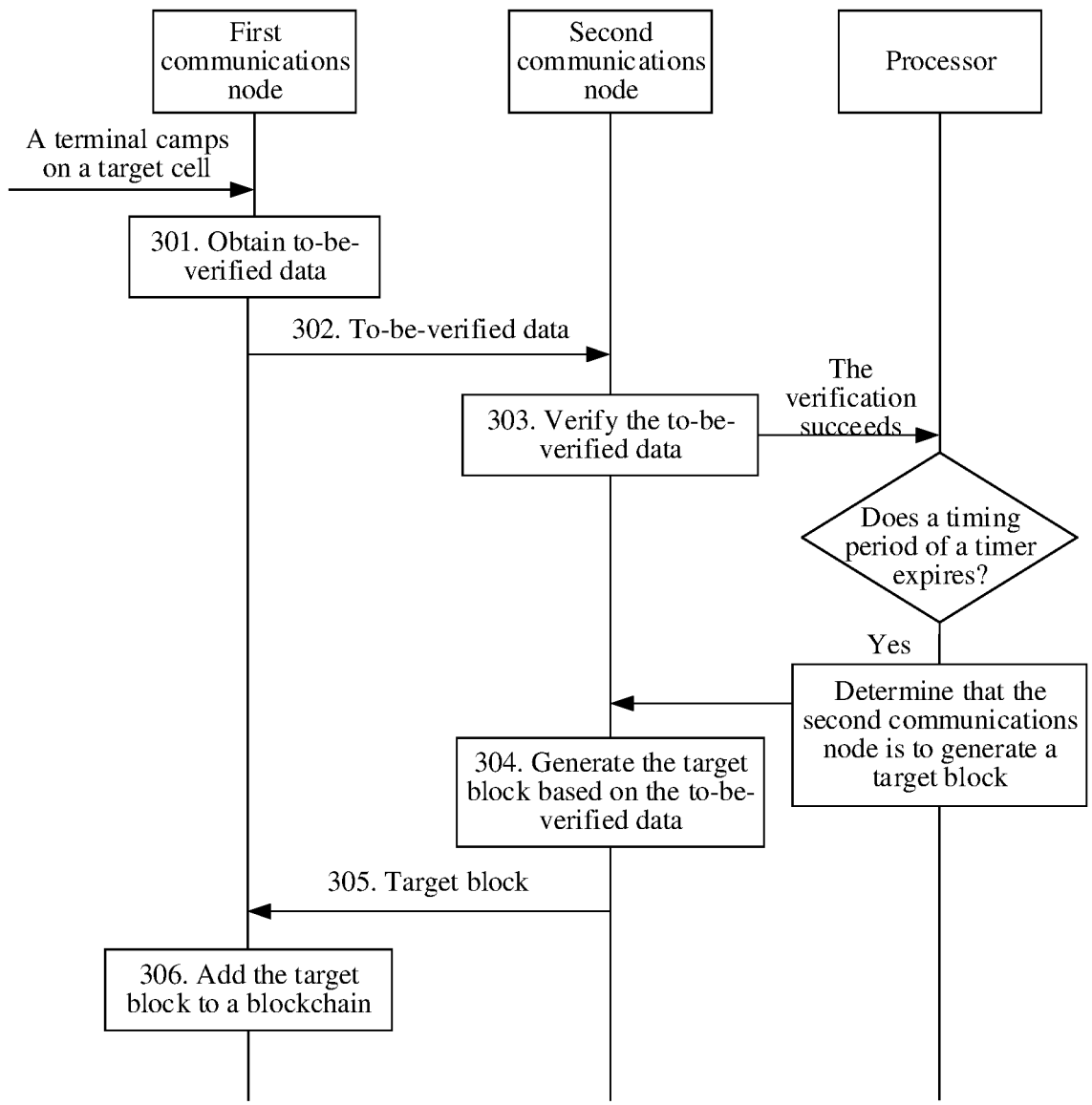
FIG. 3(b) is a schematic diagram of another embodiment of a data processing method according to this application.

In this embodiment, the first communications node obtains the target block in a plurality of manners. One of blockchain nodes is determined in a contention manner or a non-contention manner, and a communications node corresponding to the blockchain node generates the target block. Therefore, the target block may be generated by the first communications node, or may be generated by the second communications node. Referring to FIG. 3(a) and FIG. 3(b), the following separately describes the two cases.

1. Referring to FIG. 3(a), a case in which the first communications node generates the target block is described.

301. The first communications node obtains the to-be-verified data.

302. The first communications node sends the to-be-verified data to the second communications node.

Steps 301 and 302 in this embodiment are similar to steps 201 and 202 in the foregoing embodiment. Details are not described herein again.

303. The second communications node verifies the to-be-verified data.

A manner in which the second communications node verifies the to-be-verified data and a meaning of historical camping information are similar to those in the foregoing step 202. Details are not described herein again.

304: If a verification result is that the verification succeeds, the first communications node generates the target block based on the to-be-verified data.

If the verification result is that the verification succeeds, after a timing period of a preset timer expires, a processor in a data processing system determines that the first communications node is to generate the target block, and the first communications node generates the target block based on all to-be-verified data that is successfully verified within the period.

Optionally, the first communications node verifies a hash (hash) value of the target block, and adds the target block to a first blockchain node after the verification succeeds.

If the verification result is that the verification fails, the first communications node and the second communications node delete the to-be-verified data stored in local storage units.

Optionally, if the verification result is that the verification succeeds, the second communications node may further send the verification result to the first communications node, so that the first communications node generates the target block based on a verification success message after obtaining the verification success message, or the first communications node may directly generate the target block without obtaining a verification success message. This is not specifically limited herein.

305: The first communications node broadcasts the target block to the second communications node.

After generating the target block, the first communications node broadcasts the target block to the second communications node.

306: The second communications node adds the target block to a blockchain.

The second communications node verifies the hash value of the target block, and after the verification succeeds, adds the target block to the blockchain maintained by the second blockchain node.

2. Referring to FIG. 3(b), a case in which the second communications node generates the target block is described.

301. The first communications node obtains the to-be-verified data.

302. The first communications node sends the to-be-verified data to the second communications node.

Steps 301 and 302 in this embodiment are similar to steps 201 and 202 in the foregoing embodiment. Details are not described herein again.

303. The second communications node verifies the to-be-verified data.

A manner in which the second communications node verifies the to-be-verified data and a meaning of historical camping information are similar to those in the foregoing step 202. Details are not described herein again.

304: If a verification result is that the verification succeeds, the second communications node generates a target block based on the to-be-verified data.

If the verification result is that the verification succeeds, after a timing period of a preset timer expires, a processor in a data processing system determines that the second communications node is to generate the target block, and the second communications node generates the target block based on all to-be-verified data that is successfully verified within the period.

Optionally, the second communications node verifies a hash value of the target block, and adds the target block to a second blockchain node after the verification succeeds.

If the verification result is that the verification fails, the first communications node and the second communications node delete the to-be-verified data stored in local storage units.

305: The second communications node broadcasts the target block to the first communications node.

After generating the target block, the second communications node broadcasts the target block to the first communications node.

306: The first communications node adds the target block to a blockchain.

The first communications node verifies a hash value of the target block, and adds the target block to a first blockchain node after the verification succeeds.

In this embodiment, after One of blockchain nodes is determined in a contention manner or a non-contention manner, a communications node corresponding to the blockchain node generates the target block, and the target block may be used to verify to-be-verified data of a next period when the target terminal camps on a cell served by the communications node again in the next period.

This application may be applied to a cell handover scenario, or may be applied to a terminal location update scenario. The following describes the two scenarios.

Figure 4:
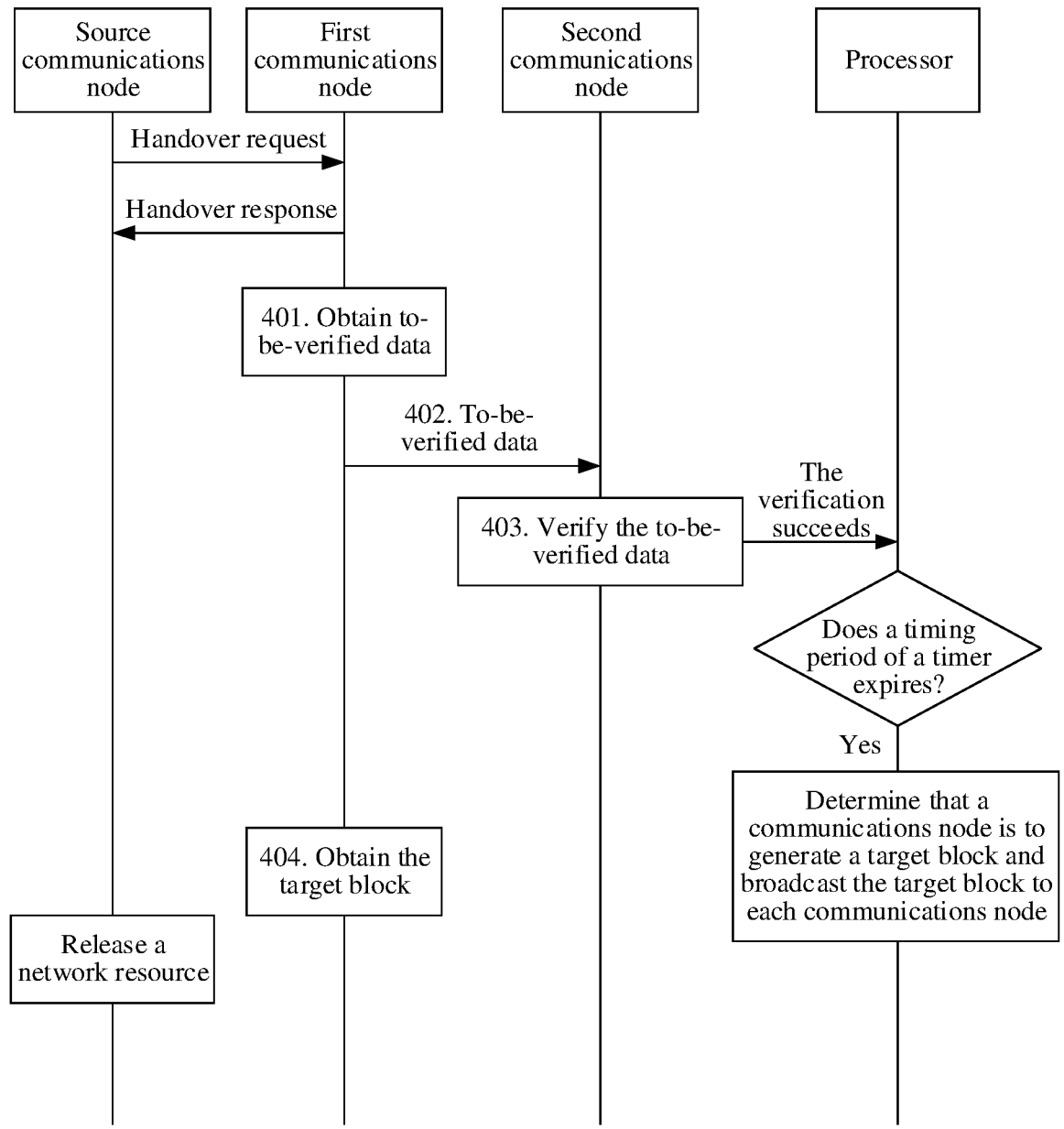
FIG. 4 is a schematic diagram of an embodiment of a cell handover scenario according to this application.

Referring to FIG. 4, the following describes an embodiment of this application based on the cell handover scenario.

401: A first communications node obtains to-be-verified data when a terminal is handed over to a target cell.

When the terminal is to be handed over from a cell within signal coverage of a source communications node to a cell within signal coverage of the first communications node, the source communications node first sends a handover request to the first communications node to request for cell handover. The first communications node feeds back a handover response identifier to allow access of the terminal. Then, the terminal performs cell handover.

In this embodiment, the source communications node is any communications node in a data processing system other than the first communications node.

Step 401 in this embodiment is similar to step 201 in the foregoing embodiment. It should be noted that camping information is specifically a handover record of the terminal, and includes information of the terminal such as a communications node identity (ID) of a cell in which the terminal is located before the handover, a communications node ID of a cell in which the terminal is located after the handover, handover time, and a terminal device capability that are obtained by the first communications node.

402. The first communications node sends the to-be-verified data to the second communications node.

Step 402 in this embodiment is similar to step 202 in the foregoing embodiment. Details are not described herein again.

403. The second communications node verifies the to-be-verified data based on a second blockchain node.

The second communications node verifies the to-be-verified data based on historical camping information in the second blockchain node, and the historical camping information is specifically a historical handover record. There are several possible cases of a verifying manner, and two cases are used as examples for description in the following, which are specifically as follows.

A. The second communications node first determines cell information that is of a cell on which the terminal camps before handed over and that is in the historical handover record, then determines cell information that is of the cell on which the terminal camps before handed over and that is in the to-be-verified data, and determines whether the cell information in the historical handover record matches the cell information in the to-be-verified data. If the cell information in the historical handover record matches the cell information in the to-be-verified data, the second communications node determines that a verification result is that the verification succeeds, or if the cell information in the historical handover record does not match the cell information in the to-be-verified data, the second communications node determines that a verification result is that the verification fails.

In this embodiment, the cell information of the cell on which the terminal camps before handed over may be an ID of a cell in which the terminal is located before the handover, may be a service level of a cell in which the terminal is located before the handover, or may be other information of a cell in which the terminal is located before the handover. This is not specifically limited herein.

For example, it may be learned from the to-be-verified data that the terminal is handed over from cell A to cell B. If it is obtained from the historical handover record that the terminal is also in cell A before the handover, the verification result is that the verification succeeds. If it is obtained from the historical handover record that the terminal is in cell C before the handover, and therefore, a handover record that the terminal is handed over from cell A to cell B is invalid, the verification result is that the verification fails. For another example, it may be learned from the to-be-verified data that the terminal is handed over from cell A to cell B, and a service level of the terminal in cell A is the highest priority. If it is obtained from the historical handover record that a service level of the terminal in cell A is also the highest priority, the verification result is that the verification succeeds. If it is obtained from the historical handover record that a service level of the terminal in cell A is a second highest priority, and therefore, a handover record that the terminal is handed over from cell A to cell B is invalid, the verification result is that the verification fails.

B. The second communications node determines, based on the to-be-verified data, that the terminal is handed over to the target cell, determines a permission level in the historical handover record that the target cell is allowed to be accessed, determines a permission level of the terminal in the to-be-verified data or the historical handover record, and determines, based on the two permission levels, whether the terminal has permission to access the target cell. If the terminal has the permission to access the target cell, the verification succeeds, otherwise, the verification fails. For example, it may be learned from the to-be-verified data that the terminal is handed over from cell A to cell B, and it is found from the historical handover record that security permission of the terminal in cell B is higher than a security permission level granted to the terminal, and the permission level of the terminal is not increased. Therefore, a handover record that the terminal is handed over from cell A to cell B is invalid, and the verification result is that the verification fails.

404: The first communications node obtains a target block if the verification result is that the verification succeeds.

The step 404 of this embodiment is similar to step 203 in the foregoing embodiment. Details are not described herein again.

After the first communications node obtains the target block, the source node releases a network resource, the first communications node allocates a network resource to the terminal, and the handover is completed.

In this application, a cell handover process of the terminal can be completed only by using interaction between the first communications node and the second communications node, and data interaction between a satellite and a gateway of a ground segment is not required, thereby reducing network overheads.

Figure 5:
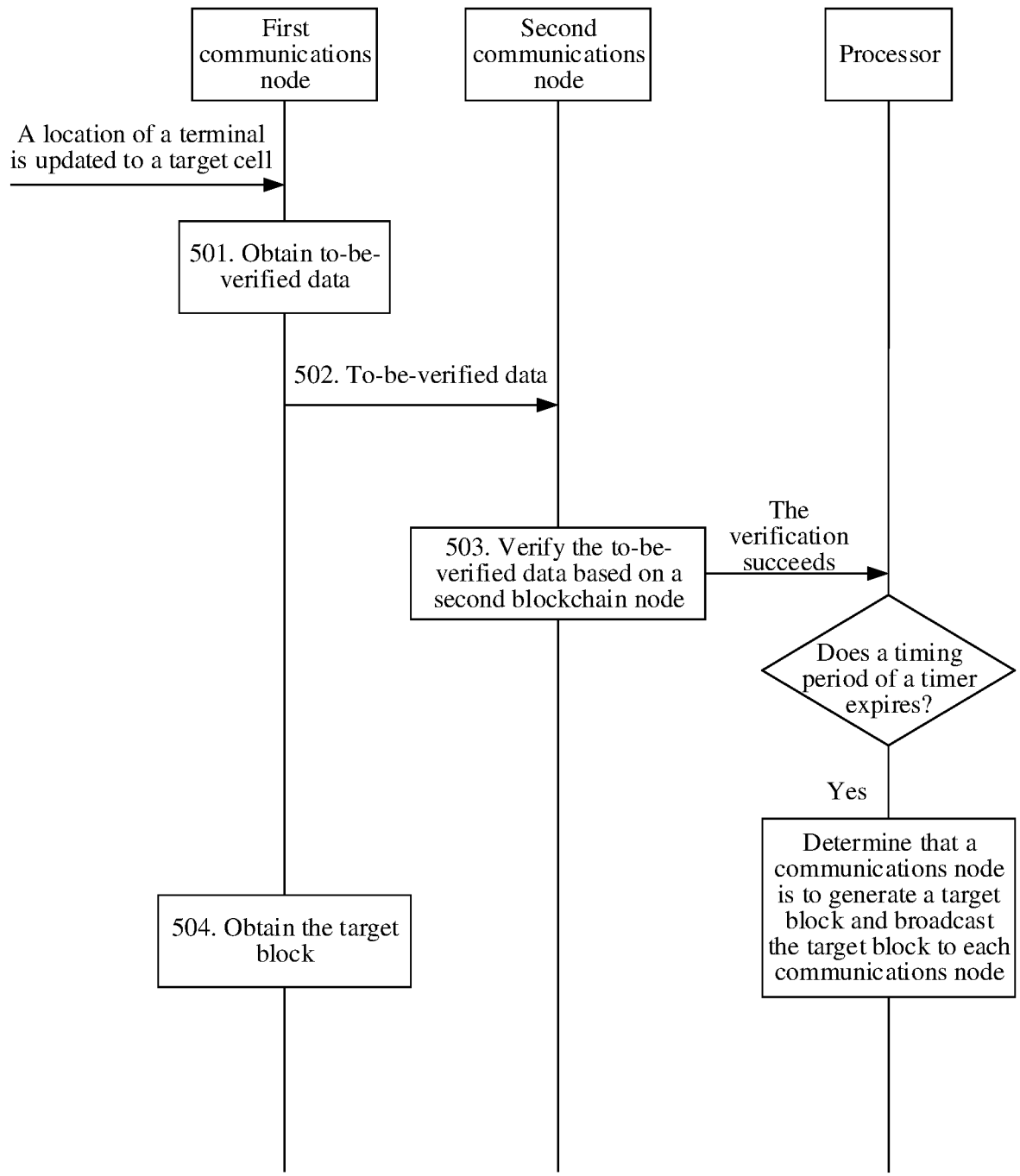
FIG. 5 is a schematic diagram of an embodiment of a terminal location update scenario according to this application.

Referring to FIG. 5, the following describes an embodiment of this application based on a scenario in which a terminal accesses a target cell after performing location update.

501: A first communications node obtains to-be-verified data when a location of the terminal is updated to the target cell.

The terminal first obtains system information of the accessed cell, to determine a current location of the terminal, and then determines, based on the current location, whether the terminal performs location update. If the terminal performs location update, for example, the terminal moves from city A to city B, the terminal initiates a random access process to the first communications node, establishes an RRC connection, and sends a location update request to the first communications node. After the terminal accesses the target cell, the first communications node generates the to-be-verified data based on camping information.

Step 501 in this embodiment is similar to step 201 in the foregoing embodiment. It should be noted that the camping information is specifically information such as a terminal ID, camping time, and a terminal device capability.

502. The first communications node sends the to-be-verified data to the second communications node.

Step 502 in this embodiment is similar to step 202 in the foregoing embodiment. Details are not described herein again.

503. The second communications node verifies the to-be-verified data based on a second blockchain node.

The second communications node verifies the to-be-verified data based on historical camping information in the second blockchain node, and the historical camping information is specifically historical location update information. A specific verification manner may be as follows.

The second communications node determines, based on the to-be-verified data, that the terminal is handed over to the target cell, determines a permission level in a historical handover record that the target cell is allowed to be accessed, determines a permission level of the terminal in the to-be-verified data or the historical handover record, and determines, based on the two permission levels, whether the terminal has permission to access the target cell. If the terminal has permission to access the target cell, the verification succeeds, otherwise, the verification fails. For example, it may be learned from the to-be-verified data that the terminal is handed over from cell A to cell B, and it is found from the historical handover record that security permission of the terminal in cell B is higher than a security permission level granted to the terminal, and the permission level of the terminal is not increased. Therefore, a handover record that the terminal is handed over from cell A to cell B is invalid, and the verification result is that the verification fails.

504: The first communications node obtains a target block if the verification result is that the verification succeeds.

The step 504 of this embodiment is similar to step 203 in the foregoing embodiment. Details are not described herein again.

After the first communications node obtains the target block, the first communications node allocates a network resource to the terminal, and location update of the terminal is completed.

In this application, a cell location update process of the terminal can be completed only by using interaction between the first communications node and the second communications node, and data interaction between a satellite and a gateway of a ground segment is not required, thereby reducing network overheads.

Figure 6:
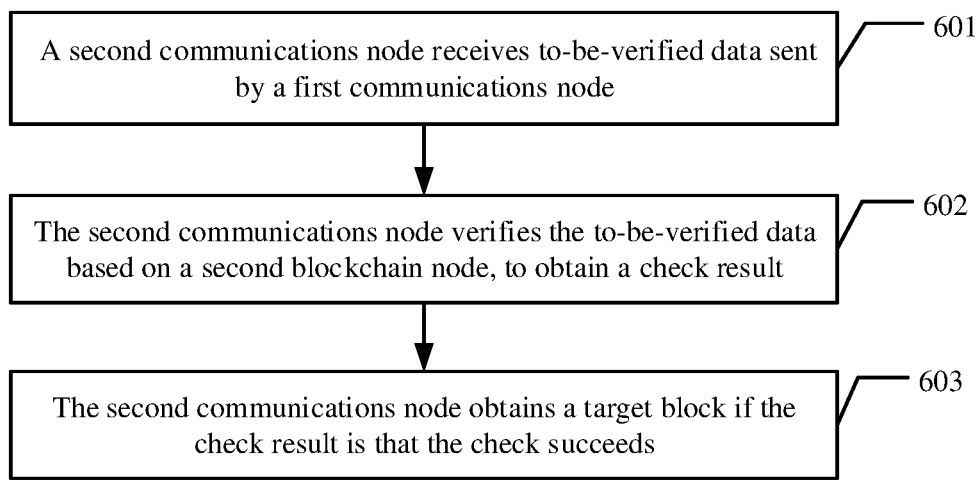
FIG. 6 is a schematic diagram of another embodiment of a data processing method according to this application.

Referring to FIG. 6, the following describes an embodiment of this application from a perspective of a second communications node.

601. The second communications node receives to-be-verified data sent by a first communications node.

Step 601 in this embodiment is similar to step 201 in the foregoing embodiment. Details are not described herein again.

602. The second communications node verifies the to-be-verified data based on a second blockchain node, to obtain a verification result.

A manner in which the second communications node verifies the to-be-verified data is similar to that in the foregoing step 202. Details are not described herein again.

Similarly, for a terminal handover scenario and a terminal location update scenario, for manners in which the second communications node verifies the to-be-verified data, refer to the embodiments in FIG. 4 and FIG. 5. Details are not described herein again.

603: The second communications node obtains a target block if the verification result is that the verification succeeds.

Similarly, the target block may be generated by the first communications node and then sent to the second communications node, or may be generated by the second communications node. Refer to the embodiments in FIG. 3(*a*) and FIG. 3(*b*). Details are not described herein again.

This application further provides a data processing method, which may be applied to a network access authentication process of a terminal, and is described below.

In a scenario in which the terminal needs authentication, for example, when the terminal is powered on, performs location update, or accesses a network for the first time, each communications node in a data processing system verifies network access authentication data of the terminal. When the terminal accesses the network for the first time, after successfully verifying the network access authentication data of the terminal, each communications node generates a target block and adds the target block to a corresponding blockchain node. When the terminal accesses the network not for the first time, each communications node can verify network access authentication data of the terminal by using historical network access authentication data stored in the blockchain node corresponding to the communications node. Referring to FIG. 7(*a*), the following describes the method.

701. A first communications node obtains to-be-verified data.

After a terminal camps on a target cell, because the target cell is a cell within signal coverage of the first communications node, the first communications node delivers public key information to the terminal, so that the terminal encrypts public key information of the terminal and a terminal ID by using a public key of the first communications node, and feeds back the public key information of the terminal and the terminal ID to the first communications node. Then, the first communications node performs decryption by using a private key of the first communications node, to obtain a public key of the terminal, encrypts session key information by using the public key of the terminal, and then sends the encrypted session key information to the terminal. The terminal performs decryption by using a private key of terminal, to obtain a session key. The terminal encrypts terminal information by using the session key, and sends the encrypted terminal information to the first communications node.

The terminal information includes information of the terminal such as network access authentication data and a terminal device capability. The to-be-verified data is the network access authentication data. After obtaining the to-be-verified data, the first communications node stores the to-be-verified data in a local storage unit.

When the terminal accesses the network for the first time, the method includes the following.

702. The first communications node verifies the to-be-verified data.

The first communications node verifies the network access authentication data of the terminal, and determines whether the terminal has permission to access a network. If the terminal has the permission to access the network, a verification result is that the verification succeeds, and the first communications node stores the to-be-verified data in the local storage unit of the first communications node, otherwise, a verification result is that the verification fails.

703. The first communications node sends the to-be-verified data to the second communications node if the verification result of the first communications node is that the verification succeeds.

If the verification result of the first communications node is that the verification succeeds, the first communications node signs the to-be-verified data with the private key, and then broadcasts the to-be-verified data to the second communications node. The second communications node performs decryption by using the public key of the first communications node, to obtain the to-be-verified data.

704. The second communications node verifies the to-be-verified data.

The second communications node verifies the network access authentication data of the terminal, and determines whether the terminal has the permission to access the network. If the terminal has the permission to access the network, a verification result is that the verification succeeds, and the second communications node stores the to-be-verified data in a local storage unit of the second communications node, otherwise, a verification result is that the verification fails.

705. The first communications node obtains a target block if the verification result of the second communications node is that the verification succeeds.

Step 705 in this embodiment is similar to step 203 in the foregoing embodiment. One of blockchain nodes is determined in a contention manner or a non-contention manner, and a communications node corresponding to the blockchain node generates the target block. Therefore, the target block obtained by the first communications node may be generated by the first communications node, or may be generated by the second communications node. Details are not described herein again.

After the target block is generated, the first communications node and the second communications node each add the target block to a corresponding blockchain node, so that when the terminal accesses the network again, each blockchain node may verify network access authentication data of the terminal by using the stored target block.

Figure 7A:
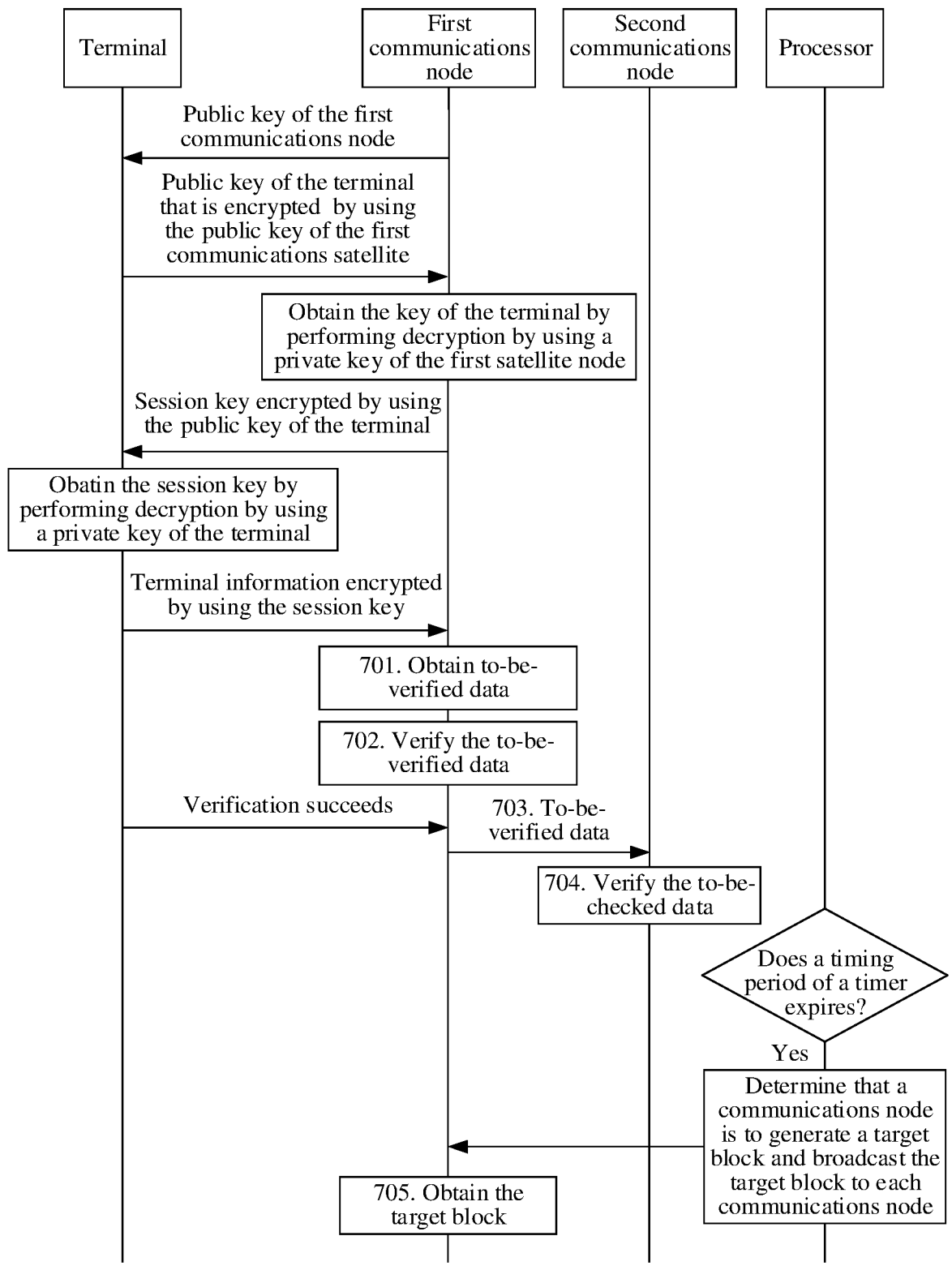
FIG. 7(a) is a schematic diagram of another embodiment of a data processing method according to this application.
Figure 7B:
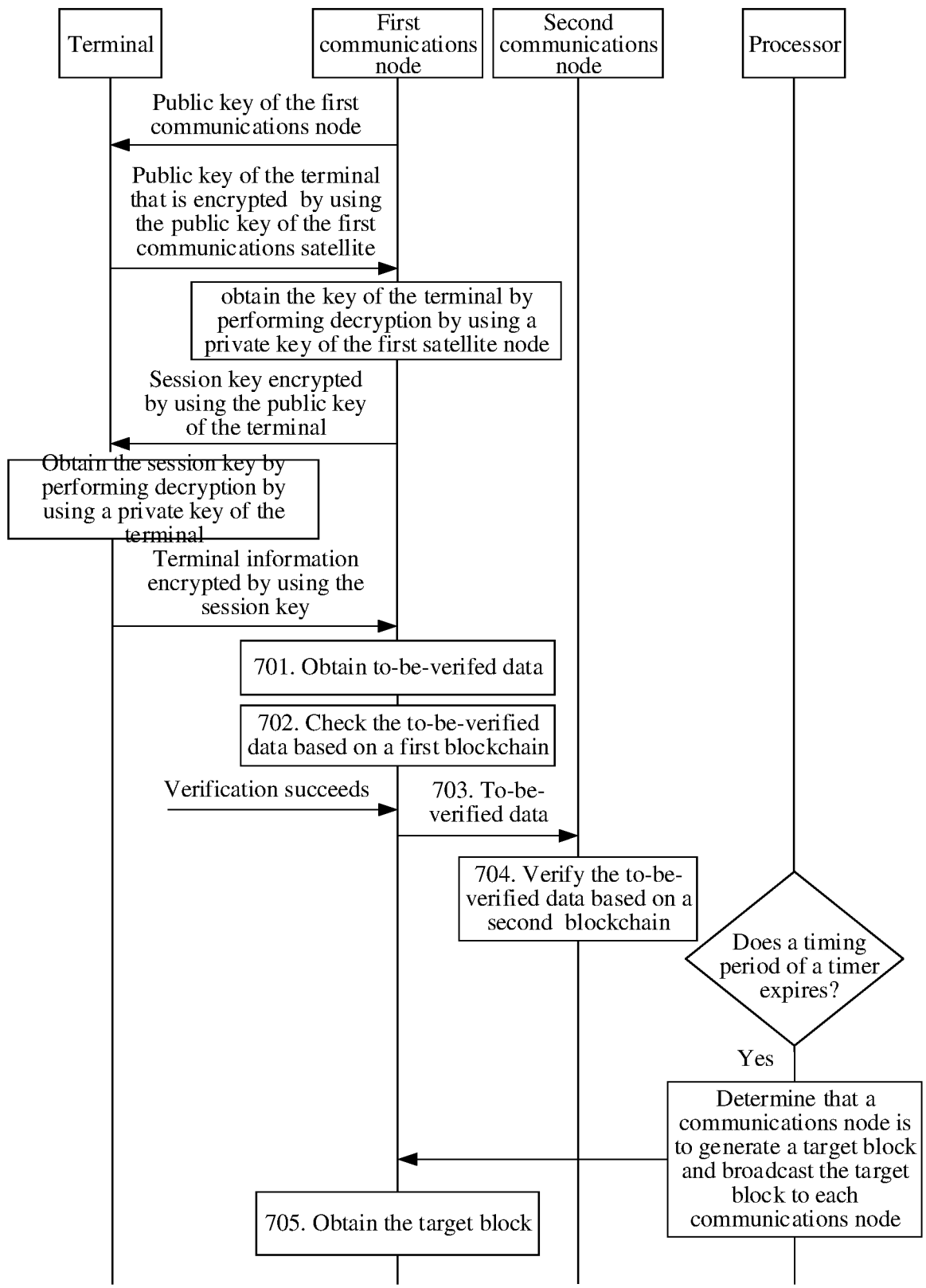
FIG. 7(b) is a schematic diagram of another embodiment of a data processing method according to this application.

Alternatively, when the terminal accesses the network not for the first time, referring to FIG. 7(b), the method includes the following steps.

701. A first communications node obtains to-be-verified data.

The step in this embodiment is similar to step 701 in the embodiment in FIG. 7(a). Details are not described herein again.

702. The first communications node verifies the to-be-verified data based on a first blockchain node.

In this embodiment, the first blockchain node stores historical network access authentication data, and the historical network access authentication data may be a target block that is stored in a blockchain node when the terminal accesses the network for the first time.

That the first communications node verifies the network access authentication data of the terminal, and determines whether the terminal has permission to access the network is specifically that the first communications node determines whether the network access authentication data of the terminal is stored in the historical network access authentication data, if the network access authentication data of the terminal is stored in the historical network access authentication data, a verification result is that the verification succeeds, and the first communications node stores the to-be-verified data in a local storage unit of the first communications node, otherwise, a verification result is that the verification fails.

703. The first communications node sends the to-be-verified data to a second communications node if the verification result of the first communications node is that the verification succeeds.

If the verification result of the first communications node is that the verification succeeds, the first communications node signs the to-be-verified data with a private key, and then broadcasts the to-be-verified data to the second communications node. The second communications node performs decryption by using the public key of the first communications node, to obtain the to-be-verified data.

704. The second communications node verifies the to-be-verified data based on a second blockchain node.

In this embodiment, the second blockchain node also stores the historical network access authentication data.

That the second communications node verifies the network access authentication data of the terminal, and determines whether the terminal has the permission to access the network is specifically that the second communications node determines whether the network access authentication data of the terminal is stored in the historical network access authentication data, if the network access authentication data of the terminal is stored in the historical network access authentication data, a verification result is that the verification succeeds, and the second communications node stores the to-be-verified data in a local storage unit of the second communications node, otherwise, a verification result is that the verification fails.

705. The first communications node obtains a target block if the verification result of the second communications node is that the verification succeeds.

Step 705 in this embodiment is similar to step 203 in the foregoing embodiment. One of blockchain nodes is determined in a contention manner or a non-contention manner, and a communications node corresponding to the blockchain node generates the target block. Therefore, the target block obtained by the first communications node may be generated by the first communications node, or may be generated by the second communications node. Details are not described herein again.

It may be understood that the data processing methods shown in FIG. 7(a) and FIG. 7(b) are applied to but are not limited to a terminal authentication scenario, and other cases similar to the terminal authentication scenario also fall within the protection scope of this application.

It may be learned that, in this application, the target block is generated when the terminal accesses the network for the first time, and is added to the blockchain node, so that when the terminal accesses the network not for the first time, an authentication process of the terminal can be completed only by using interaction between the first communications node and the second communications node, and data exchange between a satellite and a gateway of a ground segment is not required, thereby reducing network overheads.

Figure 8:
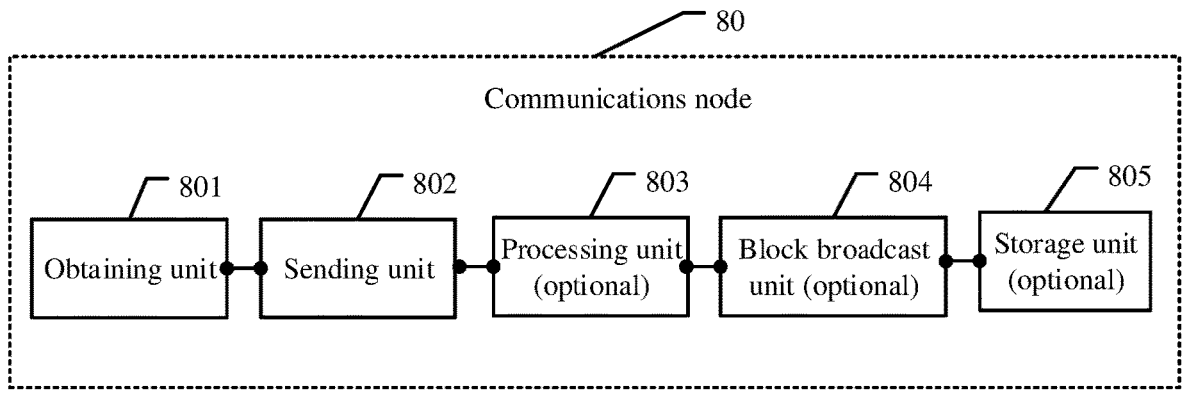
FIG. 8 shows a possible structure of a communications node according to this application.

The foregoing describes this application from a perspective of the data processing method. Referring to FIG. 8, the following describes a possible structure of a communications node in this application.

The communications node 80 is a first communications node in a data processing system, the data processing system further includes a second communications node, the first communications node corresponds to a first blockchain node, the second communications node corresponds to a second blockchain node, the first blockchain node and the second blockchain node maintain a same blockchain, and the communications node 80 includes an obtaining unit 801, configured to obtain to-be-verified data when a terminal camps on a target cell, where the to-be-verified data is obtained based on camping information of the terminal, and the target cell is a cell within signal coverage of the first communications node, and a sending unit 802, configured to send the to-be-verified data to the second communications node, so that the second communications node verifies the to-be-verified data based on the second blockchain node, where the obtaining unit 801 is further configured to obtain a target block if a verification result is that the verification succeeds.

Optionally, the terminal performs the step of camping on the target cell after the terminal is handed over to the target cell, the communications node further includes a processing unit 803, and that the to-be-verified data is obtained based on camping information of the terminal includes that the to-be-verified data is generated by the processing unit 803 based on cell information of a cell on which the terminal camps before handed over, and the cell information of the cell on which the terminal camps before handed over is used by the second communications node to match cell information that is of the terminal before the handover and that is in the second blockchain node.

Optionally, the terminal performs the step of camping on the target cell after the terminal is handed over to the target cell or a location of the terminal is updated to the target cell, the communications node further includes a processing unit 803, and that the to-be-verified data is obtained based on camping information of the terminal includes that the to-be-verified data is generated by the processing unit 803 based on a permission level of the terminal, and the permission level of the terminal is used by the second communications node to verify, based on the second blockchain node, access permission of the terminal relative to the first communications node.

Optionally, the obtaining unit 801 is specifically configured to generate the target block based on the to-be-verified data, the communications node further includes a block broadcast unit 804, configured to broadcast the target block to the second communications node, so that the second communications node adds the target block to blockchain maintained by the second blockchain node, and the obtaining unit 801 is further configured to receive a verification success message sent by the second communications node, where the verification success message is used to indicate the obtaining unit 801 to perform the step of generating the target block.

Optionally, the obtaining unit 801 is specifically configured to obtain the target block generated by the second communications node based on the to-be-verified data.

Optionally, the communications node further includes a storage unit 805, configured to add the target block to the blockchain maintained by the first blockchain node.

Figure 9:
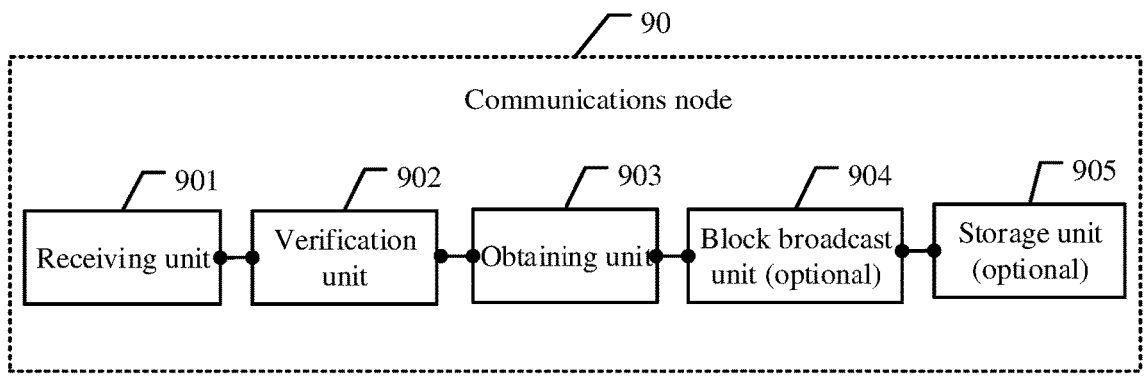
FIG. 9 shows another possible structure of a communications node according to this application.

Referring to FIG. 9, another possible structure of a communications node in this application is as follows.

The communications node 90 is a second communications node in a data processing system, the data processing system further includes a first communications node, the first communications node corresponds to a first blockchain node, the second communications node corresponds to a second blockchain node, the first blockchain node and the second blockchain node maintain a same blockchain, and the communications node 90 includes a receiving unit 901, configured to when a terminal camps on a target cell, receive to-be-verified data sent by the first communications node, where the to-be-verified data is obtained by the first communications node based on camping information of the terminal, and the target cell is a cell within signal coverage of the first communications node, a verification unit 902, configured to verify the to-be-verified data based on the second blockchain node, and an obtaining unit 903, configured to obtain a target block if a verification result is that the verification succeeds.

Optionally, the terminal performs the step of camping on the target cell after the terminal is handed over to the target cell, and the verification unit 902 is specifically configured to determine, based on a historical handover record in the second blockchain node, cell information of a terminal before the handover, and match cell information that is of the terminal before the handover and that is in the to-be-verified data with the cell information that is of the terminal before the handover and that is in the historical handover record, to obtain a matching result.

Optionally, the terminal performs the step of camping on the target cell after the terminal is handed over to the target cell or a location of the terminal is updated to the target cell, and the verification unit 902 is specifically configured to determine a permission level of the terminal in the to-be-verified data, and verify, based on the second blockchain node, access permission of the terminal relative to the first communications node, to obtain a verification result.

Optionally, the obtaining unit 903 is specifically configured to generate the target block based on the to-be-verified data, and the communications node further includes a block broadcast unit 904, configured to broadcast the target block to the first communications node, so that the first communications node adds the target block to the first blockchain node.

Optionally, the obtaining unit 903 is specifically configured to obtain the target block generated by the first communications node based on the to-be-verified data.

Optionally, the communications node further includes a storage unit 905, configured to add the target block to the first blockchain node.

Figure 10:
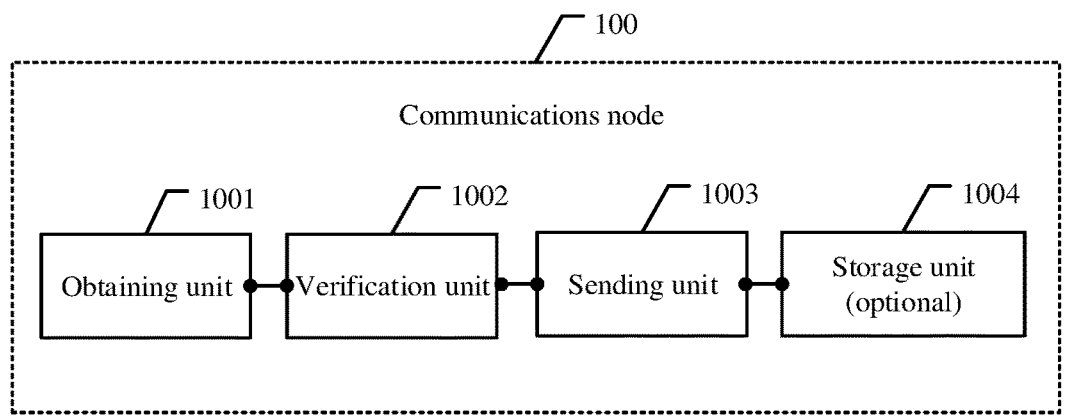
FIG. 10 shows another possible structure of a communications node according to this application.

Referring to FIG. 10, another possible structure of a communications node in this application is as follows.

The communications node 100 is a first communications node in a data processing system, the data processing system further includes a second communications node, the first communications node corresponds to a first blockchain node, the second communications node corresponds to a second blockchain node, the first blockchain node and the second blockchain node maintain a same blockchain, and the communications node 100 includes an obtaining unit 1001, configured to obtain to-be-verified data when a terminal camps on a target cell, where the to-be-verified data includes first network access authentication data of the terminal, and the target cell is a cell within signal coverage of the first communications node, a verification unit 1002, configured to verify the to-be-verified data, and a sending unit 1003, configured to send the to-be-verified data to the second communications node if a verification result of the verification unit 1002 is that the verification succeeds, so that the second communications node verifies the to-be-verified data, where the obtaining unit 1001 is further configured to obtain a target block if a verification result of the second communications node is that the verification succeeds.

Optionally, the communications node further includes a storage unit 1004, configured to add the target block to the first blockchain node, where the first blockchain node to which the target block is added is used by the verification unit 1002 to verify network access verification data of the terminal that completes the first network access authentication.

Figure 11:
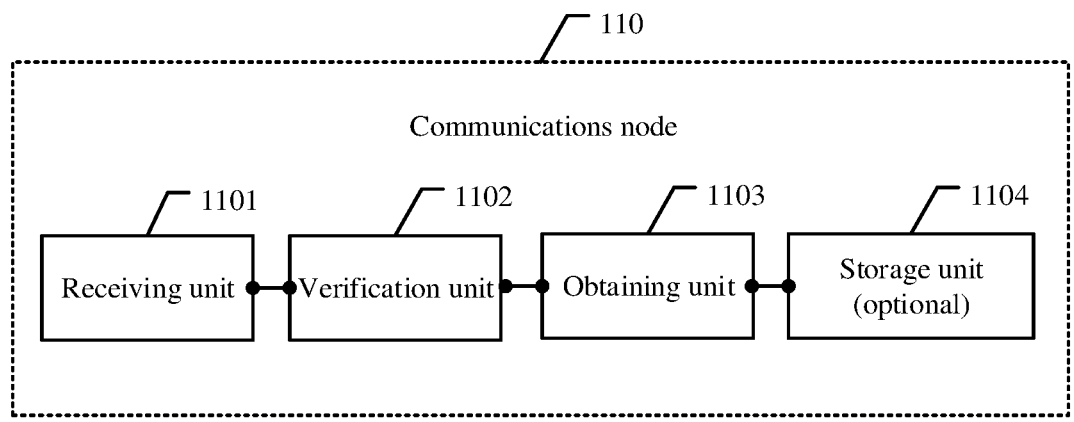
FIG. 11 shows another possible structure of a communications node according to this application.

Referring to FIG. 11, another possible structure of a communications node in this application is as follows.

The communications node 110 is a second communications node in a data processing system, the data processing system further includes a first communications node, the first communications node corresponds to a first blockchain node, the second communications node corresponds to a second blockchain node, the first blockchain node and the second blockchain node maintain a same blockchain, and the communications node 110 includes a receiving unit 1101, configured to when a terminal camps on a target cell, receive to-be-verified data sent by the first communications node, where the to-be-verified data is data that is successfully verified by the first communications node, the to-be-verified data includes first network access authentication data of the terminal, and the target cell is a cell within signal coverage of the first communications node, a verification unit 1102, configured to verify the to-be-verified data, and an obtaining unit 1103, configured to obtain a target block if a verification result of the verification unit 1102 is that the verification succeeds.

Optionally, the communications node further includes a storage unit 1104, configured to add the target block to blockchain maintained by the second blockchain node, where the blockchain to which the target block is added is used by the verification unit 1102 to verify network access verification data of the terminal that completes the first network access authentication.

It should be noted that content such as information exchange between the modules/units of the apparatus and the execution processes thereof is based on the same idea as the method embodiments of this application, and produces the same technical effects as the method embodiments of this application. For the specific content, refer to the foregoing description in the method embodiments of this application, and the details are not described herein again.

Figure 12:
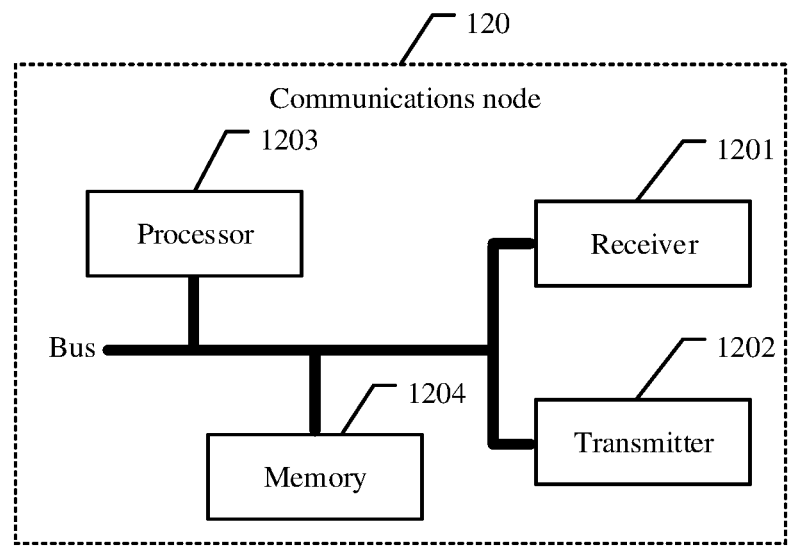
FIG. 12 shows another possible structure of a communications node according to this application.

Referring to FIG. 12, the following describes another possible structure of a communications node 120 in this application. The communications node 120 includes a receiver 1201, a transmitter 1202, a processor 1203, and a memory 1204 (there may be one or more processors 1203 in the communications node 120, and an example in which there is one processor is used in FIG. 12). In some embodiments of this application, the receiver 1201, the transmitter 1202, the processor 1203, and the memory 1204 may be connected by using a bus or in another manner, and an example in which the receiver 1201, the transmitter 1202, the processor 1203, and the memory 1204 are connected by using a bus is used in FIG. 12. Alternatively, the memory may be integrated with the processor.

The memory 1204 may include a read-only memory and a random access memory, and provide an instruction and data to the processor 1203. A part of the memory 1204 may further include a non-volatile random access memory (NVRAM). The memory 1204 stores an operating system and an operation instruction, an executable module or a data structure, or a subset thereof, or an extended set thereof. The operation instruction may include various operation instructions used to implement various operations. The operating system may include various system programs used to implement various basic services and process a hardware-based task.

The processor 1203 controls operations of the communications node 120, and the processor 1203 may also be referred to as a central processing unit (CPU). In a specific application, components of the communications node 120 are coupled together by using a bus system. In addition to a data bus, the bus system includes a power bus, a control bus, and a status signal bus. However, for clear description, various types of buses in the figure are marked as the bus system.

The methods disclosed in the embodiments of this application may be applied to the processor 1203, or may be implemented by using the processor 1203. The processor 1203 may be an integrated circuit chip and has a signal processing capability. In an implementation process, steps in the foregoing methods can be implemented by using a hardware integrated logical circuit in the processor 1203, or by using instructions in a form of software. The processor 1203 may be a general-purpose processor, a digital signal processor (DSP), an application-specific integrated circuit (ASIC), a field-programmable gate array (FPGA) or another programmable logical device, a discrete gate or a transistor logic device, or a discrete hardware component. The processor 1203 may implement or perform the methods, steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and completed by using a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory 1204, and the processor 1203 reads information in the memory 1204 and completes the steps in the foregoing methods in combination with hardware of the processor 1203.

The receiver 1201 may be configured to receive input digital or character information, and generate a signal input related to a related setting and function control of the communications node. The transmitter 1202 may include a display device such as a display screen, and the transmitter 1202 may be configured to output digital or character information by using an external interface.

In this embodiment of this application, the processor 1203 is configured to perform the foregoing methods.

In addition, it should be noted that the described apparatus embodiment is merely an example. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by this application, connection relationships between modules indicate that the modules have communication connections with each other, which may be specifically implemented as one or more communications buses or signal cables.

Based on the description of the foregoing implementations, a person skilled in the art may clearly understand that this application may be implemented by software in addition to universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for this application, software program implementation is a better implementation in most cases. Based on such an understanding, the technical solutions of this application essentially or the part contributing to the prior art may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of this application.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, and or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A data processing method, wherein the method is applied to a data processing system, the data processing system comprises a first communications node and a second communications node, the first communications node corresponds to a first blockchain node, the second communications node corresponds to a second blockchain node, and the first blockchain node and the second blockchain node maintain a same blockchain, the method comprising: obtaining, by the first communications node, to-be-verified data in response to a terminal camping on a target cell, wherein the to-be-verified data is obtained based on camping information of the terminal, wherein the target cell is a cell within signal coverage of the first communications node, wherein the terminal camping on the target cell comprises at least one of the terminal entering the signal coverage of the first communications node or the terminal being handed over to the target cell, and wherein the camping information comprises a security permission level granted to the terminal;

sending, by the first communications node, the to-be-verified data to the second communications node; and obtaining, by the first communications node, a target block in response to the to-be-verified data being successfully verified by the second communications node based on historical camping data stored in the second blockchain node, wherein the historical camping data comprises a historical handover record which includes a security permission level granted to the target cell.

2. The method according to claim 1, wherein the terminal camps on the target cell after the terminal is handed over to the target cell; and wherein the to-be-verified data being obtained based on camping information of the terminal comprises the to-be-verified data being generated by the first communications node based on cell information of a cell on which the terminal camps before being handed over.

3. The method according to claim 1, wherein the terminal camps on the target cell after the terminal is handed over to the target cell or a location of the terminal is updated to the target cell; and wherein the to-be-verified data being obtained based on camping information of the terminal comprises the to-be-verified data being generated by the first communications node based on the security permission level of the terminal.

4. The method according to claim 1, wherein the obtaining the target block comprises:

generating, by the first communications node, the target block based on the to-be-verified data;

wherein the method further comprises:

receiving, by the first communications node, before the generating the target block, a verification success message sent by the second communications node, wherein the verification success message indicates to the first communications node to perform the step of generating the target block; and sending, by the first communications node, the target block to the second communications node, such that the second communications node adds the target block to the blockchain maintained by the second blockchain node.

5. The method according to claim 1, wherein the obtaining the target block comprises:

obtaining, by the first communications node, the target block from the second communications node, wherein the target block is generated by the second communications node based on the to-be-verified data.

6. The method according to claim 1, the method further comprising:

adding, by the first communications node, after the obtaining the target block, the target block to the blockchain maintained by the first blockchain node.

7. A data processing method, wherein the method is applied to a data processing system, the data processing system comprises a first communications node and a second communications node, the first communications node corresponds to a first blockchain node, the second communications node corresponds to a second blockchain node, and the first blockchain node and the second blockchain node maintain a same blockchain, the method comprising: receiving, by the second communications node, to-be-verified data sent by the first communications node in response to a terminal camping on a target cell, wherein the to-be-verified data is associated with camping information of the terminal, wherein the target cell is a cell within signal coverage of the first communications node, wherein the terminal camping on the target cell comprises at least one of the terminal entering the signal coverage of the first communications node or the terminal being handed over to the target cell, and wherein the camping information comprises a security permission level granted to the terminal;
    verifying, by the second communications node, the to-be-verified data based on historical camping data stored in the second blockchain node, wherein the historical camping data comprises a historical handover record which includes a security permission level granted to the target cell; and
    obtaining, by the second communications node, a target block in response to the to-be-verified data being successfully verified.

8. The method according to claim 7, wherein the terminal camps on the target cell after the terminal is handed over to the target cell; and
    wherein the verifying the to-be-verified data comprises:
        determining, by the second communications node based on a historical handover record in the second blockchain node, cell information of a cell on which the terminal camps before being handed over; and
        obtaining, by the second communications node, a matching result by matching the cell information that is of the cell on which the terminal camps before being handed over and that is in the to-be-verified data with the cell information that is of the cell on which the terminal camps before handed over and that is in the historical handover record, the second communications node verifying the to-be-verified data according to the matching result.

9. The method according to claim 7, wherein the terminal camps on the target cell after the terminal is handed over to the target cell or a location of the terminal is updated to the target cell; and wherein the verifying the to-be-verified data comprises: determining, by the second communications node, the security permission level of the terminal according to the to-be-verified data; and obtaining, by the second communications node based on the second blockchain node, a verification result by verifying access permission of the terminal relative to the first communications node.

10. The method according to claim 7, wherein the obtaining the target block comprises:
    generating, by the second communications node, the target block based on the to-be-verified data; and
    the method further comprising:
        sending, by the second communications node, the target block to the first communications node, such that the first communications node adds the target block to the blockchain maintained by the first blockchain node.

11. The method according to claim 7, wherein the obtaining the target block comprises:
    obtaining, by the second communications node, the target block, wherein the target block is generated by the first communications node based on the to-be-verified data.

12. The method according to claim 7, further comprising:
    adding, by the second communications node, after the obtaining the target block, the target block to the blockchain maintained by the second blockchain node.

13. A communications node, comprising: a transceiver; a processor; and a non-transitory computer readable medium having a program stored thereon for execution by the processor, the program having instructions to: receive, through the transceiver, to-be-verified data sent by a first communications node in response to a terminal camping on a target cell, wherein the to-be-verified data is associated with camping information of the terminal, wherein the target cell is a cell within signal coverage of the first communications node, wherein the terminal camping on the target cell comprises at least one of the terminal entering the signal coverage of the first communications node or the terminal being handed over to the target cell, and wherein the camping information comprises a security permission level granted to the terminal;
    verify the to-be-verified data based on historical camping data stored in a second blockchain node, wherein the historical camping data comprises a historical handover record which includes a security permission level granted to the target cell; and
    obtain a target block in response to a verification result indicating that the verification succeeds.

14. The communication node according to claim 13, wherein the instructions to verify the to-be-verified data include instructions to:
    determine, based on a historical handover record in the second blockchain node, cell information of a cell on which the terminal camps before being handed over; and
    obtain a matching result, by matching cell information that is of the cell on which the terminal camps before being handed over and that is in the to-be-verified data with the cell information that is of the cell on which the terminal camps before being handed over and that is in the historical handover record, verify the to-be-verified data according to the matching result.

15. The communication node according to claim 13, wherein the instructions to verify the to-be-verified data include instructions to: determine the security permission level of the terminal according to the to-be-verified data; and
    obtain, by verifying access permission of the terminal relative to the first communications node based on the second blockchain node, a verification result.

16. The communication node according to claim 13, wherein instructions to obtain a target block include instructions to:
    generate the target block based on the to-be-verified data; and
    wherein the program further includes instructions to:
        send the target block to the first communications node, such that the first communications node adds the target block to a blockchain maintained by a first blockchain node of the first communications node.

17. The communication node according to claim 13, wherein the instructions to obtain the target block include instructions to:
    obtain the target block from the first communications node, wherein the target block is generated by the first communications node based on the to-be-verified data.

18. The communication node according to claim 13, wherein the program further includes instructions to:
  add the target block to a blockchain maintained by the second blockchain node.

19. The communication node according to claim 13, wherein the program further includes instructions to:
  act as a second blockchain node and maintain the blockchain of the second blockchain node.

20. The communication node according to claim 19, wherein the program further includes instructions to:
  send, to the first communications node, a verification success message indicating, to the first communications node, verification of the to-be-verified data and to perform the step of generating the target block; and
  wherein the instructions to obtain the target block include instructions to:
    receive, from the first communications node, the target block; and
    add the target block to the blockchain maintained by the second blockchain node.

\* \* \* \* \*